United States Patent Office 3,687,799
Patented Aug. 29, 1972

3,687,799
GLASS LASERS OF INCREASED HEAT DISSIPATION CAPABILITY MADE BY ION EXCHANGE TREATMENT OF THE LASER GLASS
Louis Spanoudis, Toledo, Ohio, assignor to Owens-Illinois, Inc.
No Drawing. Filed Dec. 11, 1969, Ser. No. 884,358
Int. Cl. B32b 7/00; H01s 3/16
U.S. Cl. 161—164
8 Claims

ABSTRACT OF THE DISCLOSURE

Glass lasers containing at least 1 mole percent of lithium oxide based on the total glass composition expressed in oxide content and having a compressive stress surface layer whereby increased strength and increased heat dissipation capability is obtained. The compressive stress surface layer has essentially the same composition as the remainder of the glass laser except that the concentration of lithium ions is less than the remainder of said glass laser, and the concentration of ions of a different alkali metal is greater than the remainder of the glass laser. Laser glasses are generally first acid washed and then contacted with a salt of an alkali metal other than lithium at an elevated temperature and for a sufficient period of time to replace a portion of the lithium ions in the surface of the glass laser with the ions of the different alkali metal and thereby form the compressive stress layer in the surface, but for a time insufficient to produce any substantial relaxation of the stress formed in the surface layer. As a result of this treatment there is developed on the surface of the glass laser a thin surface layer of low order tension and a thicker underlayer of high compressive stress. The tension surface layer is then removed by acid wash to expose the compression layer.

---

Glass lasers designed for high energy applications are exposed to great amounts of heat. When a glass laser rod is pumped at high energy levels the major energy fraction is heat which is absorbed by the rod causing it to become hot. Under prolonged conditions of operation, heating of the glass rod causes considerable distortion. In order to prevent distortion some methods in the prior art have resorted to water cooling of the rod. However, cooling of the rod in this manner has not been altogether successful because the outside surface of the rod tends to go into tension. Longitudinal cracks have resulted in rods treated in this way and have rendered the glass rods useless for laser purposes. A common problem in the glass laser field is the particular damage which occurs when a heavily pumped glass laser is fired a number of times in rather rapid succession. Owing to the heat absorbed by the glass laser rod, a thermal gradiant is set up and produces a stress condition whereby the center of the rod is under compression and the surface in tension. When the thermal gradient reaches such a magnitude that the tensile stress at the rod surface exceeds the rupture strength of the glass, the rod fractures. The damaged rod may exhibit either a lacework pattern of cracks or a single crack tending to split the rod lengthwise.

There is an upper limit to the magnitude of the thermal gradient that a laser rod can sustain and still retain its integrity. This thermal gradient merely reflects the rate at which heat is removed from the rod; i.e. heat must be removed at a rate which equals or exceeds the rate at which it is applied.

It is clear that the maximum sustainable thermal gradient determines the maximum average power at which the laser rod can be safely irradiated. In other words, the maximum power handling capability of a laser rod is determined by that point at which the thermally induced tensile stress at the surface exceeds its rupture strength. For typical laser rods, this maximum power handling capability is relatively independent of the diameter of the rod and can be described in terms of a power loading per unit length.

The power loading referred to is the heat absorbed by the laser rod when irradiated by the flash lamp and usually represents between 15% and 25% of the flash lamp electrical input. For example, a glass laser rod being pumped over six inches of its length will withstand, without breaking, a maximum electrical input of about 1200 watts or 200 watts per inch. This figure corresponds to an absorbed power of about 300 watts or 50 watts per inch.

The power loading capability or breakage point of a laser rod can be improved to a limited extent by using certain geometric configurations. For example, a hollow rod or tube can have a higher breakage point than a solid rod by a factor of two or three and still retain a reasonable efficiency. Aside from the doughnut-shaped beam produced by tubes, this shape has other drawbacks, however. For example, the inner and outer surfaces must be cooled equally to gain full benefit, and usually this can only be accomplished by allowing the coolant to flow over the rod face. Such cooling causes the problems referred to above, namely, the outside surface of the rod tends to go into tension and as a result longitudinal cracks may form in the rod.

A much greater improvement in the average power handling capability of glass laser rods is therefore desired to accurately challenge the capabilities of flashlamps. In order to achieve that capability the glass laser rod's resistance to breakage should be improved by a substantial factor, for example, at least four or five.

Several methods have been proposed for increasing the strength of glass laser rods. The approaches of decreasing the thermal expansion or increasing the thermal conductivity involves changing the composition of the glasses. In the case where the composition of the glass laser is highly important or critical for achieving certain beneficial results it is undesirable to modify the glass composition in any way.

It has now been determined that a significant improvement in the power handling capability of glass laser rods can be obtained and that the rod's resistance to mechanical abuse can be significantly improved without changing the composition of the glass. This is accomplished in accordance with the present invention by forming a surface compressive layer in the glass laser component whereby increased strength and increased heat dissipation capability can be achieved.

Accordingly, it is an object of the present invention to provide glass laser components of increased heat dissipation capability and glass laser components of greater strength which overcome the problems that have been associated with prior glass lasers.

It is a further object of the present invention to provide a method for increasing the strength of glass laser rods.

It is a still further object of the present invention to provide a method of improving glass laser rods so that the glass laser rods can withstand high energy loading and perform satisfactorily.

In attaining the above objects, one feature of the present invention resides in a glass laser component which has formed in the surface thereof a compressive stress layer.

A further feature of this invention resides in improved glass lasers containing at least 1 mole percent lithium oxide based on the total glass composition expressed in oxide content having a surface compressive stress layer which is essentially the same composition as the remainder of the glass laser except that the concentration of lithium ions is less in the surface compressive stress layer than in the remainder of the glass laser and wherein the concentration of ions of a different alkali metal is greater in the compressive stress layer than in the remainder of the glass laser.

According to a further feature of the present invention, the glass laser rod containing at least 1 mole percent lithium is acid treated with an etching agent to remove at least a portion of the surface defects and/or flaws. The acid treated rod is then chemically tempered by contacting the glass laser rod with a salt of a different alkali metal at an elevated temperature for a sufficient period of time to exchange a portion of the lithium ion in the surface of the glass laser for the ions of the different alkali metal in contact with the glass surface. When glass lasers of high lithium oxide content; e.g. 20 mole percent are treated, a shallow, low order tension stress generally forms on the surface with a high compression layer underneath. The final step in the proces is an acid wash to remove the thin tension layer on the surface and expose the underlying compressive stress layer.

The foregoing as well as other objects, features and advantages of the present invention will become apparent to those skilled in the art from the following detailed description of the invention.

Glass lasers for high energy application containing considerable amounts of lithium oxide have been disclosed in the art. For example, Lee et al. U.S. Pat. 3,471,409 discloses lithia silicate laser glasses containing at least 15 mole percent lithium oxide and which are highly efficient. The laseable substance contained in these glass lasers is neodymium oxide. In accordance with the present invention, glass lasers containing lithium oxide can be even further improved to remarkably improve their strength characteristics. Glass laser components containing at least 1 mole percent lithium oxide based on the total glass composition expressed in oxide content and containing a suitable laseable substance such as a rare earth oxide, e.g. neodymium oxide, can be treated in the following manner to form a compressive stress layer in the surfaces thereof.

In general, it has been found that the glass laser rod should first be contacted with an acid etching agent such as hydrofluoric acid to remove at least a portion, preferably substantially all, the surface imperfections, defects, flaws, which deleteriously affect the strength of the laser rod. An aqueous solution of hydrofluoric acid, either alone or mixed with other suitable materials known in the art, can be conveniently used for this purpose. The temperature of the etching bath can vary although ambient conditions or room temperature is sufficient for this purpose. The time of immersion, again, can vary widely from about two seconds to several minutes depending on the size and configuration of the laser as well as other factors. The hydrofluoric acid concentration in the etching bath is not narrowly critical and the generally well known hydrofluoric acid etching baths can be used for purposes of this invention, e.g. containing 38.8% by weight hydrofluoric acid. It is preferable to wash the acid from the rod after the immersion and this can be conveniently accomplished by rinsing in warm water. The acid immersion or acid washing procedure can be repeated several times in order to achieve adequate etching.

Following the acid etching step, the glass laser is immersed or otherwise contacted with a salt of a different alkali metal. The term "different alkali metal" as used herein means sodium, potassium, rubidium and cesium. For purposes of this invention, salts of sodium and potassium are preferred, with salts of sodium being most preferred. The salt of a different alkali metal can be in the form of a molten salt bath or can be used in an aqueous solution or organic solvent solution or in water and organic solvent mixtures. Sprays, mists and any other convenient method can be used for application of the salt to the glass laser rod. A molten bath of sodium nitrate at an eleveated temperature of, for example, 350° C. (662° F.) has been found to be particularly satisfactory. The period of time can range from 5 minutes to 50 hours. The glass laser treated in this manner generally develops a combination surface layer that ranges from 5 to 15 microns deep of low order tension with an underlayer of high compression which ranges from at least about 10, preferably 50 to 100 microns thick.

The third step of the process involves removal of the tension layer that is formed in the second step. The glass removal rate in the initial acid washing or fortification procedure of the first step can be calculated and then the required duration of the final acid wash can be calculated to remove an average tension layer. Thus, if the glass removal rate is 1.25 microns per second, then an acid dip of 4 seconds each for a total of 12 seconds would be sufficient to remove an average tension layer. In an actual test cross-sectioning of the samples revealed that in fact the tension surface layer was removed.

It has also been determined that with glass having a relatively low or no lithium content there is a minimum, if any, problem of tensile stress formation in the glass rod. Hence, the problem of the low order tension layer does not occur except in the area of high lithium containing laser glasses. Consequently, the final acid wash may not be necessary to obtain a useful product.

In forming a glass laser rod, the molten glass composition made from the usual glass forming batch ingredients is first cast as a billet using conventional or available techniques. The glass billet can be formed into a suitable rod by a grinding technique such as a centerless grinder. These procedures leave a relatively rough surface layer on the rod having many surface imperfections which considerably reduces the strength of the rod. Therefore, the initial acid etching step is usually desirable.

In carrying out the present invention any molten alkali metal salt, other than a lithium salt, can be used which does not decompose at the temperatures employed providing it is capable of disassociating so that it frees the alkali metal ion for ion exchange in replacing the lithium ion in the surface of the glass rod. Generally, temperatures below the strain point of the glass are preferred, particularly from 50° to 100° C. below the strain point, although this can be varied. The temperature for the ion exchange is usually at least 200° C. and less than the fiber softening point of the glass. The elevated temperature and the duration of the ion exchange step should be insufficient to relax the compressive stress formed in the surface layer of the glass laser.

Thus, sodium salts such as sodium sulfate, sodium nitrate, sodium chloride, sodium fluoride and sodium phosphate can be used for purposes of the present invention. Generally, the molten alkali metal salt is placed in a suitable crucible such as a platinum crucible or preferably a ceramic crucible to prevent any metallic ions from being introduced into the molten salt bath which might interfere with the ion exchange. The size of the crucibles can vary depending upon the nature of the ion exchange reactions that take place. If small laser rods are ion exchanged then the crucible can be relatively small.

As used in the present application the expression "lithium containing glasses" are those lithium-alumina silicate glasses which contain at least about 1 mole percent generally at least about 15 mole percent lithium oxide, $Li_2O$. The following are representative lithia-silicate glass lasers suitable for practice of this invention. In these compositions, neodymium oxide, $Nd_2O_3$, is the laseable substance, however, any suitable and compatible laseable material such as a rare earth oxide can be used in place of the neodymium oxide.

Lithia-silicate glasses containing the following ingredients in the approximate mole percent:

| | |
|---|---|
| $SiO_2$ | 45–75 |
| $Al_2O_3$ | 0–8 |
| $Li_2O$ | 15–35 |
| CaO | 0.5–30 |
| $Nd_2O_3$ | 0.1–2 |

Preferred compositions are shown below in mole percent:

| | |
|---|---|
| $SiO_2$ | 48–65 |
| $Al_2O_3$ | 0–8 |
| $Li_2O$ | 20–30 |
| $CaO$ | 5–25 |
| $CeO_2$ | 0.1–0.3 |
| $Nd_2O_3$ | 0.1–2 |

Optimum compositions are shown below in mole percent:

| | |
|---|---|
| $SiO_2$ | 49–62 |
| $Al_2O_3$ | 2–5 |
| $Li_2O$ | 25–30 |
| $CaO$ | 8–22 |
| $CeO_2$ | 0.1–0.2 |
| $Nd_2O_3$ | 0.1–1 |

There are many advantages apart from increased power capability to be gained from the use of strengthened glass laser rods. For example, strengthened rods are more resistant to damage resulting from careless handling. Typically, a normal ¼" x 3" glass laser rod will shatter after a four foot drop onto the floor. A rod that has been treated and accordingly strengthened by following the procedures described in this application will usually bounce and suffer only an occasional chipping of the edge. It is expected that strengthened laser rod faces will be more resistant to damage from exploding dust particles and the like. Initial observations indicate that the strengthened faces do not interfere with lasing action.

It has been determined that under the preferred conditions of the present invention the glass laser rod having the high lithia content is acid polished with a solution of 60 volume percent of 48% hydrofluoric acid and 40 volume percent water. Multiple short dips are preferred over a longer, single dip. An intermediate rinse in concentrated sulfuric acid is preferably employed. During the rinse, an effervescence occurred which facilitates removal of the fluorides formed in the HF bath. It has been calculated that this treatment is capable of removing 1.25 microns per second when dips in the mixed acid bath were 5 seconds in duration.

When using a sodium salt for the ion exchange process, for example, the formation of the compressive layer on a high lithium glass laser rod is in accordance with the simple sodium-for-lithium ion exchange and follows the diffusion laws. Lower treatment temperatures give lower depths while higher treatment temperatures give greater depths but much less compressive stress and thicker tension layers on the surface.

The tension layer on the surface varies with the time of treatment and is extremely difficult to measure. Typical measurements are shown in the following Table 1 wherein the laser glass had the same composition as shown in Example I:

TABLE 1.—TENSION SURFACE LAYER ON GLASS OF EXAMPLE 1

[In $NaNO_3$]

| Temperature (° C.) | Treatment time (hrs.) | Tension layer thickness (microns) |
|---|---|---|
| 400 | 4 | 26 |
| 400 | 48 | 56 |
| 400 | 72 | 161 |
| 350 | 4 | 16 |
| 350 | 48 | 20 |
| 350 | 72 | 26 |

After ion exchange it was found that an acid etching process is effective in removing the tension layer on the surface. The same type of hydrofluoric acid solution is suitable for this purpose. Knowing the thickness of the tension layer formed and the glass removal rate in the acid it was possible to calculate the acid treatment. For example: in a 48 hour ion exchange conducted at 350° C. using sodium nitrate, a tension layer of about 20 microns thick was formed. Since the etch rate is 1.25 microns per second then the total etch time would be 20/1.25 or 16 seconds. This means that approximately three 5 second acid dips would remove the tension layer formed in the first step.

Rods treated for a total of 135 hours in sodium nitrate at 662° F. with intermediate acid treatments of hydrofluoric acid to remove the tension layer on the surface have an average abraded modulus of rupture of about 40,000 p.s.i. with a standard deviation of 16,000 p.s.i. This compared very favorably with untreated abraded rods which had an average modulus of rupture of 6,800 p.s.i. and a standard deviation of 375 p.s.i.

The abrasion technique was to place 5 rods in a 1 gallon plastic jar with 1000 grams of No. 46 grit silicon carbide and rotating on a ball mill rack for 15 minutes. The modulus of rupture testing was done with standard 4-point loading. Cross-sectioning of the strengthened rods revealed a stress of approximately 41,000 p.s.i. at a depth of about 70 microns.

The following example illustrates the present invention:

EXAMPLE I

A sample of the following glass laser ¼" diameter by 6" long was used in this test:

| | Weight percent |
|---|---|
| $SiO_2$ | 65 |
| $Al_2O_3$ | 5 |
| $CaO$ | 10 |
| $CeO_2$ | 0.5 |
| $Nd_2O_3$ | 3 |
| $Li_2O$ | 16.5 |

The glass laser rod was acid fortified by immersing in an aqueous solution of hydrofluoric acid at room temperature for five seconds. The hydrofluoric acid concentration was 38.8% by weight. After washing in the acid the rod was rinsed in warm tap water. This procedure was repeated 11 more times for a total of 12 times.

The rod was then immersed in a molten bath of sodium nitrate at 350° C. (662° F.) for 48 hours.

Samples treated showed a surface layer 15 microns deep of low order tension with an underlayer of 38,000 p.s.i. compression which was 80 microns thick.

The glass laser rod was then dipped three times for four seconds each for a total of 12 seconds to remove the tension layer that was formed. This was calculated on the basis that the glass removal rate using the acid wash or fortification procedure of Step 1 was 1.25 microns per second. A cross-section revealed in fact, that the tension surface layer had been removed.

Glass laser rods treated as described above were tested in a standard modulus of rupture test with a four inch support span and a ¾" load span. The following results were obtained:

TABLE 2

| Type samples | Abuse | Modulus of rupture (p.s.i.) | Standard deviation (p.s.i.) |
|---|---|---|---|
| Untreated | Silicon carbide | 6,833 | 375 |
| Strengthened | do | 13,239 | 3,739 |
| Untreated | Glass-to-glass | 24,942 | 5,944 |
| Strengthened | do | 52,432 | 1,420 |

The silicon carbide abuse was administered by placing the rods in a one gallon wide mouth polyethylene jar with 1000 grams of 46 grit silicon carbide and rotating 15 minutes on a ball mill rack.

The "glass-to-glass" abuse was identical except that there was no silicon carbide.

Using the process described in the present application the high reflectivity, high lithia containing laser glasses are not deleteriously affected. Furthermore, the glasses of the present invention have a beam divergence of only 1.5 milliradians which is due primarily to the high efficiency of the high lithium containing laser glasses combined with its higher thermal conductivity. Over 120,000 shots were made during the testing of this laser with no output degradation detected due to deterioration of the laser rod.

Usually a glass laser rod will not survive large thermal loadings because of its relatively low coefficient to thermal conductivity and relatively high coefficient to thermal expansion. At high thermal loadings, hoop stresses exceed the strength of the material and cause the rod to break. The present invention overcomes these problems and improves the utility of glass laser rods by increasing enormously the strength of the glass laser rods having a high lithia content. A comparative test conducted between an identical laser rod having the identical chemical composition and one strengthened in accordance with the present invention reveals that the unstrengthened glass laser rod fractured at power loadings of approximately 80 watts per centimeter. This figure corresponds to an average power output from the laser rod of approximately 10 watts. The strengthened rod, however, did not break and was still operating satisfactorily at more than 20 watts output. With extreme loadings applied, the strengthened rod withstood power loadings without breakage up to 400 watts per centimeter. Thus, the present invention provides a method for remarkably improving the strength of glass lasers containing at least 1 mole percent lithium oxide.

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What is claimed is:

1. A glass laser device having at least one glass surface comprising a main body portion comprising a lithia-silicate glass containing at least 1 mole percent lithium oxide based on the total glass composition expressed as oxide content and a surface layer, said surface layer having essentially the same chemical composition as the main body portion but differing therefrom by containing a relatively lower lithium ion concentration than the main body portion and having a greater concentration of ions of a different alkali metal than the main body portion, said surface layer being in compressive stress in respect to the main body portion, said body portion containing a sufficient amount of a laseable substance.

2. A glass laser rod as defined in claim 1 wherein the lithia-silicate glass contains the following ingredients in the approximate mole percent:

| | |
|---|---|
| $SiO_2$ | 45–75 |
| $Al_2O_3$ | 0–8 |
| $Li_2O$ | 15–35 |
| $CaO$ | 0.5–30 |
| $Nd_2O_3$ | 0.1–2 |

3. A glass laser rod as defined in claim 1 wherein the lithia-silicate glass contains the following ingredients in the approximate mole percent:

| | |
|---|---|
| $SiO_2$ | 48–65 |
| $Al_2O_3$ | 0–8 |
| $Li_2O$ | 20–30 |
| $CaO$ | 5–25 |
| $CeO_2$ | 0.1–0.2 |
| $Nd_2O_3$ | 0.1–1 |

4. A glass laser rod comprising a central core portion of a glass containing the following ingredients in the approximate mole percent:

| | |
|---|---|
| $SiO_2$ | 45–75 |
| $Al_2O_4$ | 0–8 |
| $Li_2O$ | 15–35 |
| $CaO$ | 0.5–30 |
| $Nd_2O_3$ | 0.1–2 | and a surface layer surrounding said core portion and being in compressive stress and of essentially the same composition as the core portion except that said surface layer contains a greater concentration of a different alkali metal ion than the interior core portion of the glass laser rod and a lesser concentration of lithium ions than the interior core portion of the glass laser rod.

5. A laser component comprising a glass body containing at least 1 mole percent of lithium oxide based on the total glass composition expressed as oxide content, wherein said glass body has a surface layer at least about 10 microns thick which is in compressive stress and which differs from the composition of the interior of the glass body in that it contains a lower concentration of lithium ions and a greater concentration of ions of a different alkali metal.

6. In a glass laser body comprising a lithia-silicate glass and a laseable component, the improvement whereby increased heat dissipation capability of the glass laser body is obtained comprising a compressive stress layer on the surface of said glass laser, said layer being essentially the same composition as the remainder of the glass laser body except that the concentration of lithium ions is less in said layer than the concentration of the lithium ions in the remainder of the glass laser and the concentration of ions of a different alkali metal is greater in said layer than in the remainder of the glass laser.

7. In the glass laser as defined in claim 6 wherein the depth of said compressive stress layer is at least 10 microns.

8. In the glass laser as defined in claim 7 wherein the ions of a different alkali metal are sodium.

References Cited

UNITED STATES PATENTS

| | | | |
|---|---|---|---|
| 3,471,409 | 10/1969 | Lee, Jr. et al. | 106—52 X |
| 3,357,876 | 12/1967 | Rinehart | 161—1 |
| 3,023,139 | 2/1962 | Tetterode | 65—31 X |
| 3,457,182 | 7/1969 | Lee, Jr. et al. | 106—52 X |

ROBERT F. BURNETT, Primary Examiner

D. J. FRITSCH, Assistant Examiner

U.S. Cl. X.R.

65—30, 31, 116; 161—165, 166; 252—301.4 R; 330—4.3; 331—94.5